US009481260B2

(12) United States Patent
Hua

(10) Patent No.: US 9,481,260 B2
(45) Date of Patent: Nov. 1, 2016

(54) INDUSTRIAL VEHICLE, SYSTEM FOR MANAGING STATE OF AMOUNT OF ELECTROLYTE OF INDUSTRIAL VEHICLE, AND ELECTRIC FORKLIFT

(71) Applicant: Komatsu Ltd., Tokyo (JP)

(72) Inventor: Feng Hua, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 132 days.

(21) Appl. No.: 14/127,688

(22) PCT Filed: Feb. 20, 2013

(86) PCT No.: PCT/JP2013/054237
§ 371 (c)(1),
(2) Date: Dec. 19, 2013

(87) PCT Pub. No.: WO2014/128870
PCT Pub. Date: Aug. 28, 2014

(65) Prior Publication Data
US 2015/0210180 A1    Jul. 30, 2015

(51) Int. Cl.
*B60L 11/18* (2006.01)
*B66F 9/24* (2006.01)
(Continued)

(52) U.S. Cl.
CPC ............ *B60L 11/1861* (2013.01); *B60L 1/003* (2013.01); *B60L 3/0046* (2013.01); *B60L 11/1877* (2013.01); *B66F 9/07572* (2013.01);
(Continued)

(58) Field of Classification Search
CPC ... B60L 2200/44; G07C 5/008; G07C 5/085; G07C 5/0858; G08G 1/20; G01S 5/0027

USPC ........................................................ 701/32.3
See application file for complete search history.

(56) References Cited

U.S. PATENT DOCUMENTS

| | | | |
|---|---|---|---|
| 6,215,312 B1* | 4/2001 | Hoenig | G01R 31/2853 324/427 |
| 2008/0154691 A1* | 6/2008 | Wellman | G05D 1/0282 705/7.26 |
| 2008/0186028 A1* | 8/2008 | Jones | G01R 31/3679 324/426 |
| 2011/0106280 A1* | 5/2011 | Zeier | H01M 10/42 700/90 |
| 2012/0109437 A1 | 5/2012 | Iwase et al. | |

FOREIGN PATENT DOCUMENTS

| | | |
|---|---|---|
| CN | 101615704 A | 12/2009 |
| DE | 2818069 A1 | 11/1979 |

(Continued)

OTHER PUBLICATIONS

International Search Report dated Jul. 2, 2013, issued for PCT/JP2013/054237.

*Primary Examiner* — Jelani Smith
(74) *Attorney, Agent, or Firm* — Locke Lord LLP

(57) ABSTRACT

An industrial vehicle includes a battery that includes battery cells including a battery liquid and connected in series, an battery liquid shortage detection unit detecting a shortage of the battery liquid by detecting a voltage value between the battery cells, an battery liquid-shortage time calculation unit calculating a battery liquid-shortage time, which is a cumulative time of the shortage of the electrolyte detected by the battery liquid shortage detection unit, a memory storing the battery liquid-shortage time calculated by the battery liquid-shortage time calculation unit, and a communication controller attaching time information to the battery liquid-shortage time stored in the memory and outputting the battery liquid-shortage time with the time information to a management server, at a predetermined timing.

17 Claims, 8 Drawing Sheets

(51) Int. Cl.
*B60L 1/00* (2006.01)
*B60L 3/00* (2006.01)
*H01M 10/48* (2006.01)
*B66F 9/075* (2006.01)

(52) U.S. Cl.
CPC ............ *B66F 9/24* (2013.01); *H01M 10/484* (2013.01); *B60L 2200/42* (2013.01); *B60L 2240/547* (2013.01); *B60L 2240/622* (2013.01); *B60L 2240/70* (2013.01); *B60L 2240/80* (2013.01); *B60L 2250/20* (2013.01); *Y02T 10/7005* (2013.01); *Y02T 10/705* (2013.01); *Y02T 10/7291* (2013.01); *Y02T 90/16* (2013.01); *Y02T 90/162* (2013.01)

(56) References Cited

FOREIGN PATENT DOCUMENTS

| | | |
|---|---|---|
| JP | 05-286700 A | 11/1993 |
| JP | 08-162172 A | 6/1996 |
| JP | 2000-036326 A | 2/2000 |
| JP | 2000-088933 A | 3/2000 |
| JP | 2002-120999 A | 4/2002 |
| JP | 2003-009402 A | 1/2003 |
| JP | 2012-100379 A | 5/2012 |
| JP | 2012-186028 A | 9/2012 |
| WO | WO-2013/008806 A1 | 1/2013 |

* cited by examiner

INDUSTRIAL VEHICLE, SYSTEM FOR MANAGING STATE OF AMOUNT OF ELECTROLYTE OF INDUSTRIAL VEHICLE, AND ELECTRIC FORKLIFT

FIELD

The present invention relates to an industrial vehicle of which the shortage of a battery liquid can be easily detected and the shortage state of a battery liquid can be easily managed, a system for managing the state of the amount of electrolyte of the industrial vehicle, and an electric forklift.

BACKGROUND

An industrial vehicle such as a forklift is provided with a battery. In particular, an electric forklift (hereinafter, a battery forklift) travels by driving a traveling motor using the battery as a power source, and performs a cargo handling operation by operating a cargo handling device through the driving of a cargo handling motor. Here, when the battery is a lead storage battery, the amount of a battery liquid (electrolyte) of the battery is decreased due to the frequent repetition of the charge and discharge of the battery or the like. If the battery is discharged when the amount of the battery liquid is decreased, the degradation of the battery is facilitated. For this reason, there is a concern that the life of the battery is shortened.

In general, when batteries are connected to each other in series, charging is also performed in series. Here, if the capacity of any one of the batteries is insufficient, the amount of charge is increased so that the battery of which the capacity is insufficient is fully charged. For this reason, the other batteries of which the capacity is not insufficient are overcharged. Overcharge causes the life of the battery to be shortened.

In particular, there is a case in which the amount of a battery liquid present in the battery is decreased by electrolysis even though natural evaporation does not occur. When electrode plates of the battery are exposed to the outside due to the shortage of the battery liquid, the degradation of the electrode plates is facilitated by oxidation. As a result, the battery reaches damage. For this reason, when the battery liquid is insufficient, the battery is to be refilled with a battery replenisher.

Accordingly, Patent Literature 1 discloses an industrial vehicle that suppresses the degradation of a battery caused by discharge when the level of the battery liquid is lowered and makes an operator reliably recognize a low battery liquid level state. In particular, Patent Literature 1 discloses an industrial vehicle that stepwise limits the torque of a traveling motor according to an operating time in a low liquid level state.

Further, Patent Literature 2 discloses an industrial vehicle that is provided with a hydrogen gas-concentration sensor near a battery and prevents explosion in advance, which is caused by a hydrogen gas generated during the charge, on the basis of the hydrogen gas-concentration detected by the hydrogen gas-concentration sensor.

Furthermore, Patent Literature 3 discloses a vehicle that detects the shortage of a battery liquid by a liquid level sensor and stores a detection result as data After that, the data are processed by a computer for data processing.

CITATION LIST

Patent Literature

Patent Literature 1: Japanese Patent Application Laid-open No. 2012-100379
Patent Literature 2: Japanese Patent Application Laid-open. No. 2003-009402
Patent Literature 3: Japanese Patent Application Laid-open No. 2002-120999

SUMMARY

Technical Problem

Incidentally, the number of industrial vehicles, which are managed from a remote location through a communication system, has increased in recent years. Meanwhile, the above-mentioned shortage of the battery liquid in the related art can be managed for an individual vehicle.

Here, when the shortage of the battery liquid of each industrial vehicle, which is managed from a remote location, is managed for each industrial vehicle, there is a case in which an operator operating the industrial vehicle or a serviceman performing maintenance neglects the management of the shortage of the battery liquid. If the management of the shortage of the battery liquid is neglected, there is a problem in that the life of the battery of the industrial vehicle is shortened. In particular, since the battery of a battery forklift is frequently charged and discharged and the battery forklift is driven by the battery as a power source, the shortening of the life of the battery causes a trouble in a cargo handling operation. Here, it is required that the states of the shortage of the battery liquid of all of the industrial vehicles, which are managed from a remote location, are managed and the states of the shortage of the battery liquid can be easily and quickly detected. Further, it is also required that the shortage of the battery liquid of a plurality of industrial vehicles can be easily managed.

Meanwhile, if each battery is provided with a liquid level sensor such as a float sensor that detects the shortage of the battery liquid, the structure of the battery becomes complicated and the generalization of the battery is hindered.

The invention has been made in consideration of the above-mentioned problems, and an object of the invention is to provide an industrial vehicle of which the shortage of a battery liquid is easily detected and the shortage state of the battery liquid can be easily managed, a system for managing the state of the amount of electrolyte of the industrial vehicle, and an electric forklift.

Solution to Problem

To overcome the problems and achieve the object, according to the present invention, an industrial vehicle comprises: a storage battery that includes a plurality of battery cells including electrolyte and connected in series; an electrolyte shortage detection unit that detects a shortage of the electrolyte by detecting a voltage value between the plurality of battery cells; an electrolyte shortage time calculation unit that calculates an electrolyte-shortage time, which is a cumulative time of the shortage of the electrolyte detected by the electrolyte shortage detection unit; a memory unit that stores the electrolyte-shortage time calculated by the electrolyte-shortage time calculation unit; a time information generating unit that generates time information; and an output processing unit that performs output processing for attaching the time information to the electrolyte-shortage time stored in the memory unit and outputting the electrolyte-shortage time with the time information to an output unit, at a predetermined timing.

According to the present invention, the electrolyte shortage detection unit stores a final electrolyte shortage time, which is a time when the shortage of the electrolyte is detected, in the memory unit and then resets the electrolyte-shortage time stored in the memory unit when the shortage of the electrolyte is not detected by the electrolyte shortage detection unit and a time elapsed from the final electrolyte shortage time exceeds a predetermined time.

According to the present invention, the electrolyte shortage detection, unit detects the shortage of the electrolyte by detecting a plurality of voltage values between the plurality of battery cells.

According to the present invention, the output processing unit performs output processing for attaching the time information to a difference time of the cumulative electrolyte-shortage time and outputting the difference time with the time information to the output unit, at a predetermined timing.

According to the present invention, the predetermined timing includes a regular time and an irregular time.

According to the present invention, the industrial vehicle, further comprises: a position detector that generates position information indicating a position of the industrial vehicle, wherein the output processing unit performs output processing for outputting the position information and the electrolyte-shortage time to the output unit, at the predetermined timing.

According to the present invention, a system for managing a state of an amount of electrolyte of an industrial vehicle, the system comprises: the industrial vehicle; and a management server that communicates with the industrial vehicle, wherein the output processing unit attaches the time information to the electrolyte-shortage time stored in the memory unit and outputs the electrolyte-shortage time with the time information to the management server by radio communication, at a predetermined timing.

According to the present invention, the management server includes a warning unit that sets warning levels depending on length of the electrolyte-shortage time and outputs warning according to the warning levels.

According to the present invention, an electric forklift comprises: a storage battery that includes a plurality of battery cells including electrolyte and connected in series; an electrolyte shortage detection unit that detects a shortage of the electrolyte by detecting a voltage value between the plurality of battery cells; an electrolyte-shortage time calculation unit that calculates an electrolyte-shortage time, which is a cumulative time of the shortage of the electrolyte detected by the electrolyte shortage detection unit; a memory unit that stores the electrolyte-shortage time calculated by the electrolyte-shortage time calculation unit; a time information generating unit that generates time information; and an output processing unit that performs output processing for attaching the time information to the electrolyte-shortage time stored in the memory unit and outputting the electrolyte-shortage time with the time information to an output unit, at a predetermined timing, wherein the electrolyte shortage detection unit detects the shortage of the electrolyte by detecting a plurality of voltage values between the plurality of battery cells, and the output unit transmits the information, which is obtained by attaching the time information to the electrolyte-shortage time stored in the memory unit, by radio communication.

According to the invention, the electrolyte shortage detection unit detects the shortage of the electrolyte by detecting a voltage value between the plurality of battery cells of the battery that includes a plurality of battery cells including electrolyte and connected in series. Accordingly, it is possible to easily detect the shortage of the electrolyte by a simple structure. Further, the electrolyte-shortage time calculation unit calculates an electrolyte-shortage time, which is a cumulative time of the shortage of the electrolyte detected by the electrolyte shortage detection unit, and the output processing unit performs output processing for attaching the time information to the electrolyte-shortage time stored in the memory unit and outputting the electrolyte-shortage time with the time information to the output unit, at a predetermined timing. Accordingly, it is easy to manage an electrolyte-shortage time.

DESCRIPTION OF EMBODIMENTS

An embodiment of the invention will be described below with reference to the accompanying drawings.

(Entire Structure of Battery Forklift)

Figure 1:
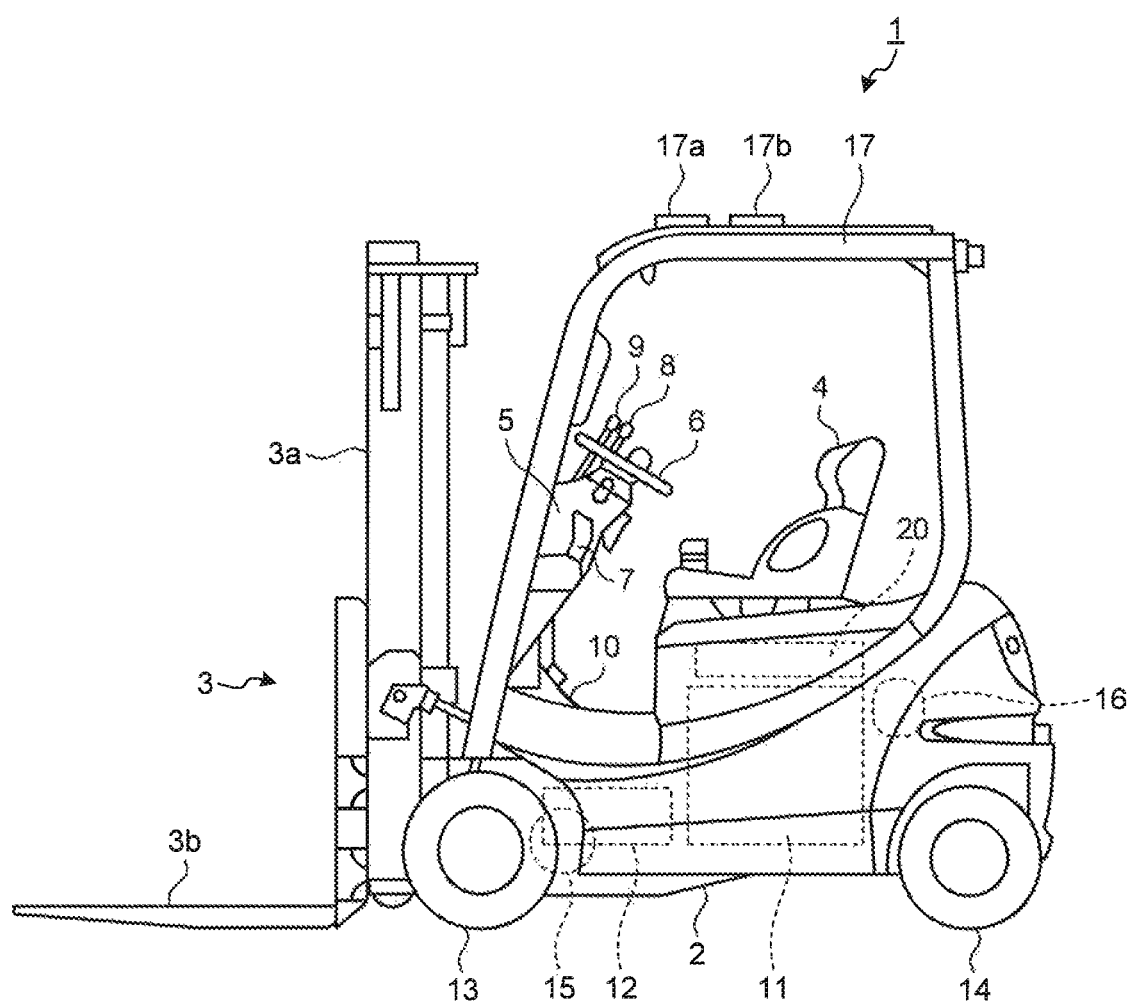
FIG. 1 is a left side view illustrating the entire schematic structure of a battery forklift that is an example of an industrial vehicle according to an embodiment of the invention.

FIG. 1 is a left side view illustrating the entire schematic structure of an electric forklift (hereinafter, referred to as a battery forklift) that is an example of an industrial vehicle according to an embodiment of the invention. As illustrated in FIG. 1, a battery forklift 1 includes a cargo handling device 3 at the front portion of a vehicle body 2. The cargo handling device 3 includes a mast 3a and a fork 3b. The fork 3b is guided by the mast 3a and moves up and down. Further, the mast 3a is tilted forward and rearward.

A driver's seat 4 is provided in the vicinity of the center of the vehicle body 2. A front console 5, a steering wheel 6, a forward/reverse lever 7, a lift lever 8, and a tilt lever 9 are provided on the front side of the driver's seat 4. Further, an accelerator pedal 10 is provided on the lower front side of the driver's seat 4. Furthermore, a brake pedal (not illustrated) is also provided on the lower front side of the driver's seat 4.

A battery 11 is accommodated below the driver's seat 4. The battery 11, which is a storage battery, is a lead storage battery, and includes thirty six 2V-battery cells that are connected in series. Each of the 2V-battery cells is filled with a predetermined amount of electrolyte. Hereinafter, the electrolyte is appropriately referred to as a battery liquid. Meanwhile, the voltage of the battery cell and the number of the battery cells are merely illustrative in this embodiment, and the invention to be described below can be applied without being limited thereto. Each of the 2V-battery cells is filled with the battery liquid. Further, a capacitor 12 is provided at the front portion of the battery 11. Meanwhile, a lead storage battery will be described as an example of the battery in this embodiment, but the battery may be other storage batteries that need to be refilled with electrolyte due to the decrease of the amount of electrolyte.

Drive wheels 13 are provided at the front portion of the vehicle body 2. Further, steered wheels 14 are provided at the rear portion of the vehicle body 2. A traveling motor 15, which is driven by the power of the battery 11 and the capacitor 12, is connected to the drive wheels 13 through a power transmission mechanism (not illustrated). The driving of the traveling motor 15 is controlled according to the operation of the accelerator pedal 10, the forward/reverse lever 7, and the like. Furthermore, the steered wheels 14 are steered according to the operation of the steering wheel 6.

A cargo handling motor 16, which is driven by the power of the battery 11 and the capacitor 12, is provided at the rear portion of the vehicle body 2. The cargo handling motor 16 is connected to a hydraulic pump (not illustrated). The hydraulic pump hydraulically drives a lift cylinder and a tilt cylinder (not illustrated). When the lift lever 8 is operated, the lift cylinder expands and contracts. When the tilt lever 9 is operated, the tilt cylinder expands and contracts. The fork 3b moves up and down and the mast 3a is tilted by the expansion and contraction of the lift cylinder and the tilt cylinder.

Meanwhile, a GPS antenna 17a and a transmission/reception antenna 17b are provided at the upper portion of a cabin 17 that surrounds the driver's seat 4. Further, a controller 20, which controls the entire battery forklift 1, is disposed below the driver's seat 4.

(Outline of System and Electrical Configuration of Battery Forklift)

Figure 2:
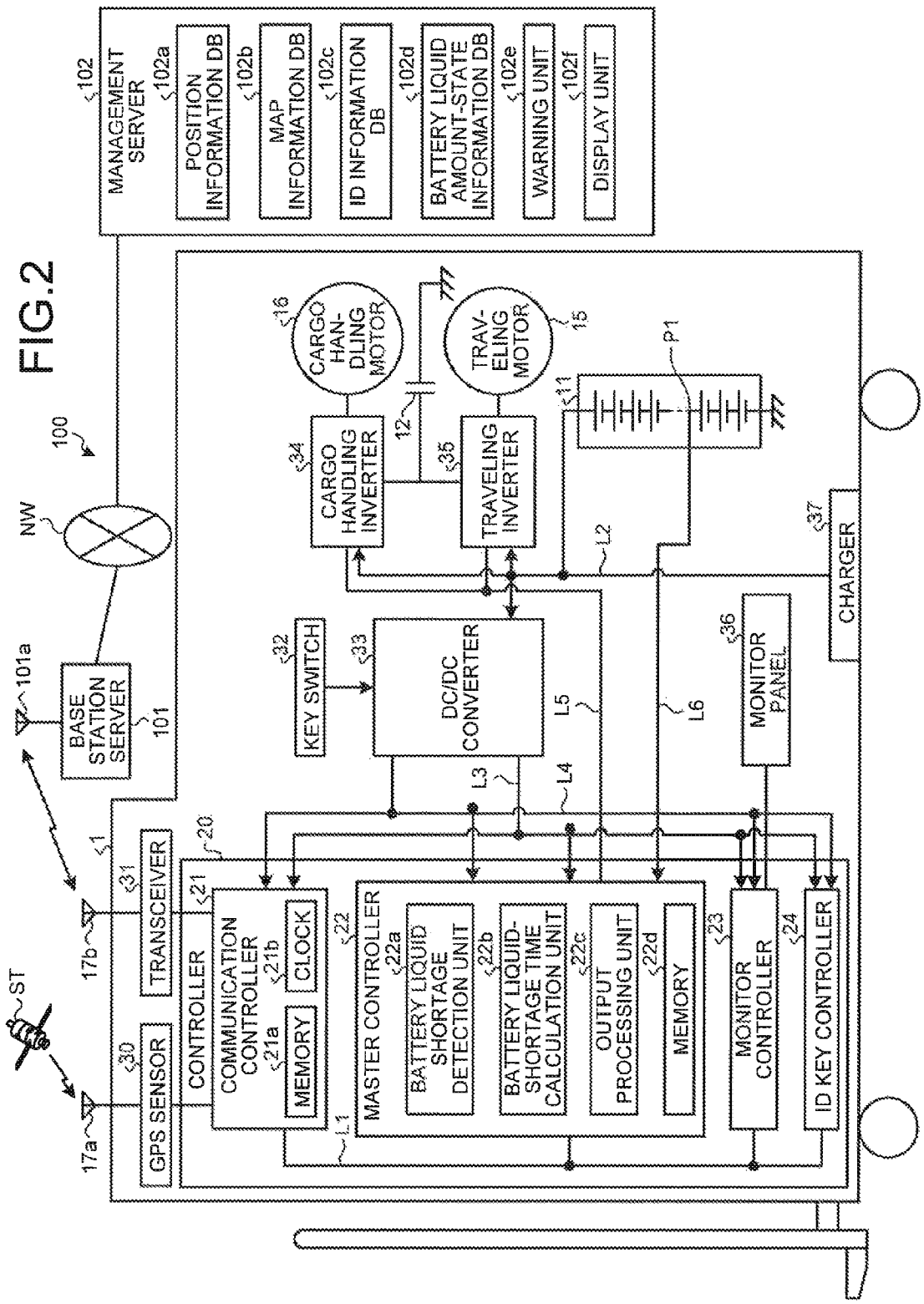
FIG. 2 is a schematic diagram illustrating the entire configuration of a system for managing the state of the amount of a battery liquid of a battery forklift according to the embodiment of the invention and the electrical configuration of the battery forklift.

FIG. 2 is a schematic diagram illustrating the entire configuration of a system 100 for managing the state of the amount of the battery liquid of the battery forklift 1 according to the embodiment of the invention and the electrical configuration of the battery forklift 1. As illustrated in FIG. 2, the system 100 for managing the state of the amount of the battery liquid includes at least one or a plurality of battery forklifts 1 to be managed and a management server 102, and the management server 102 is communicatively connected to the battery forklifts 1. Accordingly, the system 100 for managing the state of the amount of the battery liquid menaces the state of shortage of the battery liquid of each of the battery forklifts 1 by using battery liquid amount-state information that is transmitted from the battery forklifts 1. The battery forklift 1 can detect its own position on the basis of electric waves sent from a plurality of GPS satellites ST. Further, the battery forklift 1 can communicate with a base station server 101 by radio. Furthermore, the management server 102 is communicatively connected to the base station server 101 through a network NW.

The battery forklift 1 includes a GPS sensor 30 and a transceiver 31. The GPS sensor 30 is a position detector, receives electric waves sent from the GPS satellites ST through the GPS antenna 17a, detects the position of the battery forklift 1, and generates position information. Meanwhile, since time data are included in the electric waves sent from the GPS satellites ST, a time information generating unit generates time information by using the time data as described below. Further, the transceiver 31 transmits and receives information to and from the base station server 101 through the transmission/reception antenna 17b and a transmission/reception antenna 101a of the base station server 101.

The battery forklift 1 includes the controller 20, a key switch 32, a DC/DO converter 33, a cargo handling inverter 34 that drives the cargo handling motor 16, a traveling inverter 35 that drives the traveling motor 15, a monitor panel 36 that is disposed on the front console 5, a charger 37, the battery 11, and the capacitor 12.

The controller 20 includes a communication controller 21, a master controller 22, a monitor controller 23, and an ID key controller 24. The communication controller 21, the master controller 22, the monitor controller 23, and the ID key controller 24 are communicatively connected to each other through a communication line L1. The controller 20 includes an output processing unit 22c that outputs position information, battery liquid amount-state information, time information, or the like to be described below to an output unit, such as the monitor panel 36 or the transceiver 31. Meanwhile, the output processing unit 22c may be provided in the communication controller 21 or the monitor controller 23.

The battery 11 is connected to the cargo handling inverter 34, the traveling inverter 35, and the DC/DC converter 33 through a power supply line L2, and supplies power to each of the devices. Meanwhile, the charger 37 is connected to the power supply line 72. The DC/DC converter 33 is connected to the communication controller 21, the master controller 22, the monitor controller 23, and the ID key controller 24 through a power supply line L3, and supplies power, which has been converted to a predetermined voltage of, for example, 24 V, to each of the controllers. Further, the key switch 32 is connected to the DC/DC converter 33. When the key switch 32 is in a key-on state, the DC/DC converter 33 sends a key-on signal of a predetermined voltage to the communication controller 21, the master controller 22, the monitor controller 23, and the ID key controller 24 through a control line L4, The master controller 22 is connected to the cargo handling inverter 34 and the traveling inverter 35 through a drive control line L5. The master controller 22 drives the cargo handling motor 16 and the traveling motor 15 by controlling the driving of the cargo handling inverter 34 and the traveling inverter 35 according to the amount of operation of the lift lever 8, the tilt lever 9, the steering wheel 6, the forward/reverse lever 7, and the accelerator pedal 10. Meanwhile, the capacitor 12 is connected to the cargo handling inverter 34 and the traveling inverter 35. The capacitor 12 temporarily stores or releases regenerative energy under the control of the cargo handling inverter 34 and the traveling inverter 35. It is possible to significantly improve energy use efficiency by using the capacitor 12.

As described above, the battery 11 includes thirty six 2V-electrode cells connected in series and outputs a voltage of 72 V, Here, a voltage detection line L6 is provided. The voltage detection line L6 is branched from a branch point P1, which is positioned between a plus terminal of a 2V-electrode cell disposed at a predetermined position and a minus terminal of the fourth 2V-electrode cell from the minus side (ground side) and of the battery 11, and is input to the master controller 22. The branch point. P1 is disposed at the third position from the minus side of the battery 11 in this embodiment, but the number thereof is not limited to the third and may be other number. In the case of this embodiment, a detection voltage of the branch point P1 (hereinafter, appropriately referred to as a battery liquid amount-detection voltage) is in the range of 0 V to 6V. When a battery liquid amount-detection voltage is equal to or lower than a predetermined threshold, the amount of the battery liquid of one or more 2V-electrode cells among three 2V-electrode cells from the minus side is decreased and a ratio of a portion of an electrode plate immersed in the electrolyte to the electrode plate is reduced as described below. When the amount of the electrolyte is decreased, the internal resistance of the 2V-electrode cell is increased and an output voltage is decreased. Accordingly, the battery liquid amount-detection voltage is decreased. When this state is detected, it is determined that the battery liquid is insufficient. The predetermined threshold is a threshold that has been determined in advance, and is set to a value of, for example, 3 V. A liquid level sensor, such as a float sensor, may be provided in each of the 2V-electrode cells inside the battery 11 in order to detect the shortage of the amount of the battery liquid of the battery 11. However, in this embodiment, it is possible to detect the shortage of the battery liquid by a simple structure in which the voltage detection line L6 is provided at the branch point 21 positioned outside the 2V-electrode cells.

The communication controller 21 acquires position information from the GPS sensor 30. Further, the communication controller 21 acquires the operating state of the battery forklift 1 through the master controller 22 or the monitor controller 23 regularly or in response to an instruction from the management server 102. The communication controller 21 further includes a clock 21b that forms the time information generating unit. The clock 21b is formed of, for example, a clock IC, and constantly generates information indicating a time. Furthermore, time data is included in the electric waves that are sent from the GPS satellites ST, and the communication controller 21 receives the time data through the GPS antenna 17a and the GPS sensor 30. Further, the time measured by the clock IC and the received time data are compared with each other and the current time is corrected by a time correction program (not illustrated) that is stored in a memory 21a of the communication controller 21. The time correction program forms the time information generating unit, and may be stored in a memory unit that is present in the communication controller 21 and different from the memory 21a. The correction of the current time, which uses the time data received from the GPS satellites ST, is performed at a predetermined interval that is set in the time correction program. Hereinafter, the current time having been subjected to correction is referred to as time information. Meanwhile, the current time, which is obtained by the clock IC, may be used as the time information as it is without correction. That is, any one of the current time that has been subjected to correction using the electric waves sent from the GPS satellites ST and the current time that is obtained from the clock IC may be used as the time information. Furthermore, the communication controller 21 transmits moving-body information, which includes an operating state, position information, time information, and a vehicle ID, to the management server 102 through the transceiver 31. A battery liquid-shortage time that is a time when the shortage of the battery liquid of the battery 11 is detected is included in the operating state. Meanwhile, the memory 21a stores various kinds of information that are acquired by the communication controller 21. The communication controller 21 transmits the time information to the management server 102 in the form of the attachment to the battery liquid-shortage time as described below, Here, the communication controller 21 may acquire time information from the time information generating unit as a time determined in advance, that is, a time indicating a transmission timing to be described below as the time information, and may transmit the time information to the management server 102 as information that has the form of the attachment to the battery liquid-shortage time.

The master controller 22 includes a battery liquid shortage detection unit 22a, a battery liquid-shortage time calculation unit 22b, and a memory 22d. The battery liquid shortage detection unit 22a determines whether or not a battery liquid amount-detection voltage input through the voltage detection line L6 is equal to or lower than a predetermined threshold. When the battery liquid amount-detection voltage is equal to or lower than the predetermined threshold, the battery liquid shortage detection unit 22a detects the shortage of the battery liquid. The battery liquid-shortage time calculation unit 22b cumulatively adds a time at which the shortage of the battery liquid is detected. This cumulatively added battery liquid-shortage time is stored in the memory 22d. Since the battery liquid shortage detection unit 22a performs detecting processing by predetermined sampling, a predetermined sampling time is added to the battery liquid-shortage time whenever the result of the sampling result corresponds to the shortage of the battery liquid. When the acquisition of a battery liquid-shortage time is requested from the communication controller 21, the master controller 22 outputs information, which indicates the battery liquid-shortage time, from the output processing unit 22c and the communication controller 21 attaches time information, which indicates the current time measured by the time information generating unit, to the battery liquid-shortage time as a timestamp and outputs the battery liquid-shortage time with the time information. That is, the time information attached to the battery liquid-shortage time, which is output to the output unit, may be a time that indicates a time at which a battery liquid-shortage time is output to the cutout unit, and may be a time that indicates a time at which the battery liquid-shortage time is further output from the output unit, for example, a transmission timing to be described below. The above-mentioned moving-body information is stored in the memory 22d, and the memory 22d is a memory in which information to be updated, such as position information or a battery liquid-shortage time, can be updated and rewritten.

The monitor controller 23 is connected to the monitor panel 36. The monitor panel 36 is a pane including an LCD monitor and predetermined switches, a touch panel, or the like; and can input, display, and output various kinds of information. Meanwhile, the monitor panel 36 may be formed of only an LCD monitor, and may be adapted so that various kinds of information can be input, to the monitor panel 36 by separate switches or the like. The ID key controller 24 manages the IDs of operators. For example, when communication is requested from the management server 102, operator ID information stored in the ID key controller 24 is transmitted to the management server 102 through the communication controller 21. Alternatively, when a key is inserted into the key switch 32 or when a special operation of the monitor panel 36 is performed, authentication processing of an operator ID is performed to determine whether or not the operator is a person permitted to operate the battery forklift 1. An ID key in which an electronic chip storing an ID is embedded can be used as the key. When the ID key controller 24 authenticates that the operator ID is an authorized ID, the ID key controller 24 transmits a signal, which indicates the result of the authentication, to the master controller 22. As a result, the master controller 22 outputs a control signal, which allows a traveling operation or a cargo handling operation, to the DC/DC converter 33, the cargo handling inverter 34, or the traveling inverter 35.

The management server 102 includes a position information database (DB) 102a, a map information database (DB) 102b, an ID information database (DB) 102c, a battery liquid amount-state information database (DB) 102d, a warning unit 102e, and a display unit 102f. The position information DB 102a stores the position information of the battery forklifts 1 that is transmitted from the battery forklifts 1. The map information DB 102b stores map information that is necessary for the display unit 102f to display a place where each battery forklift 1 operates. The ID information DB 102c stores operator ID information. The ID information DB 102c may store vehicle ID information that is used to individually identify the respective battery forklifts 1. The battery liquid amount-state information DB 102d stores battery liquid amount-state information that indicates whether or not the battery liquid is insufficient. The warning unit 102e sets gradual warning levels depending on the length of the battery liquid-shortage time, and outputs warning according to the warning levels. The output destination of the warning may be the display unit 102f of the management server 102 or a user terminal (not illustrated) that is connected to the management server 102. Information, which indicates the warning, may be transmitted to the battery forklift 1 by radio and may be output by a display unit (not illustrated) of the monitor panel 36 or a sounder using a speaker (not illustrated) that is provided in the battery forklift 1. Meanwhile, the display unit 102f is formed of a display device such as a liquid crystal panel.

(Calculation Processing of Battery Liquid Shortage Time)

Figure 3:
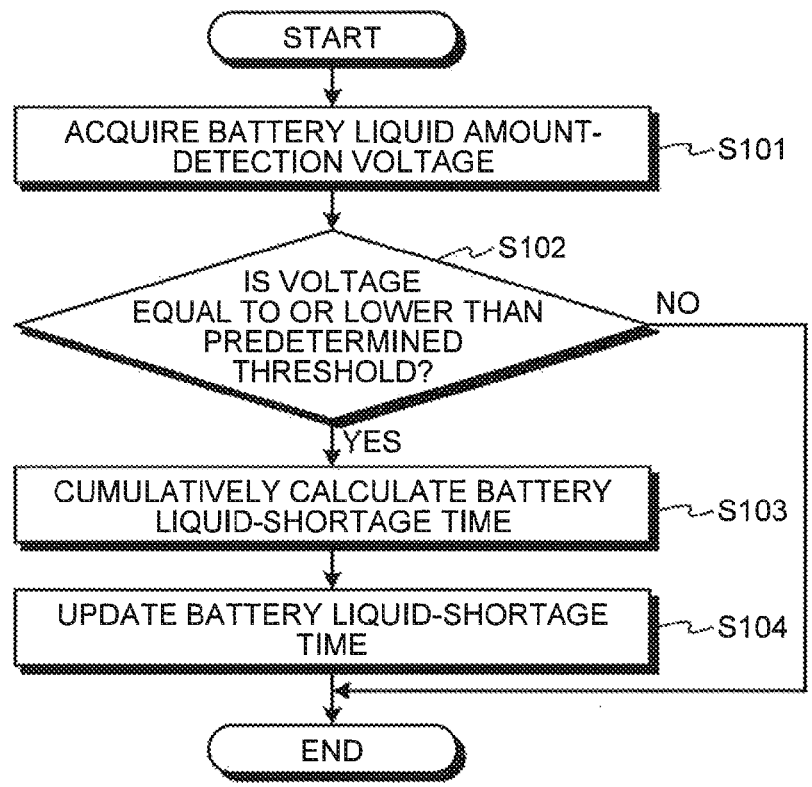
FIG. 3 is a flowchart illustrating the procedure of the calculation processing of a battery liquid-shortage time that is performed by a master controller.

Next, the procedure of the calculation processing of a battery liquid-shortage time, which is performed by the master controller 22, will be described with reference to a flowchart illustrated in FIG. 3. As illustrated in FIG. 3, the battery liquid shortage detection unit 22a acquires a battery liquid amount-detection voltage through the voltage detection line L6 by sampling that is performed at a predetermined interval (Step S101). After that, it is determined whether or not the battery liquid amount-detection voltage is equal to or lower than a predetermined threshold (Step S102).

If the battery liquid amount-detection voltage is equal to or lower than the predetermined threshold (Yes in Step S102), the battery liquid is insufficient. Accordingly, cumulative calculation for adding a time, which is elapsed between the previous sampling and the current sampling, that is, a sampling time to the battery liquid-shortage time stored in the memory 22d is performed (Step S103). After that, the battery liquid-shortage time stored in the memory 22d is updated (Step S104) and this processing ends. On the other hand, if the battery liquid amount-detection voltage is not equal to or lower than the predetermined threshold (No in Step S102), this processing ends as it is.

(Transmission Processing of Battery Liquid Shortage Time)

Figure 4:
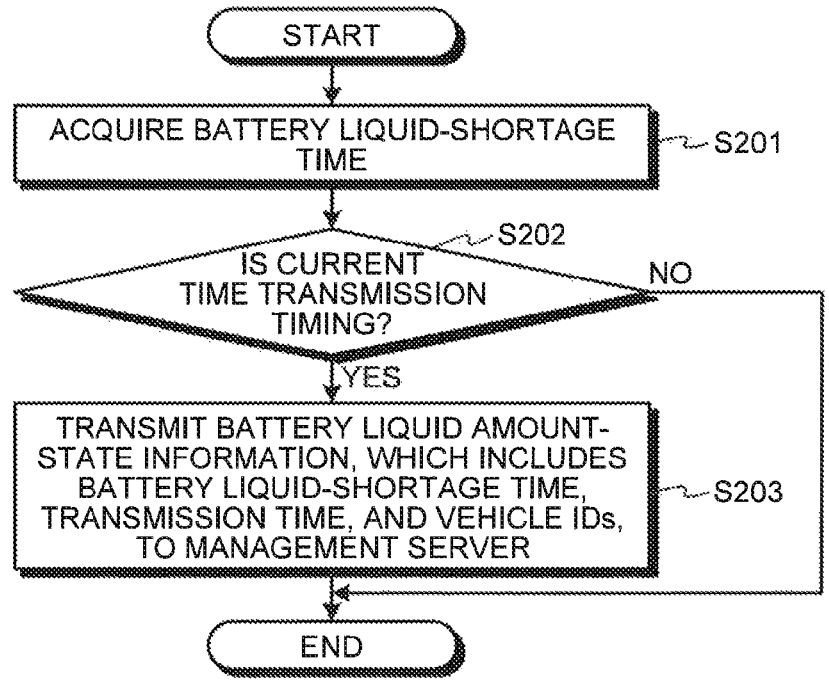
FIG. 4 is a flowchart illustrating the procedure of the transmission processing of a battery liquid-shortage time that is performed by a communication controller.

Next, the procedure of the transmission processing of a battery liquid-shortage time, which is performed by the communication controller 21, will be described with reference to a flowchart illustrated in FIG. 4. As illustrated in FIG. 4, first, the communication controller 21 acquires a battery liquid-shortage time, which is stored in the memory 22d of the master controller 22, by sampling that is performed at a predetermined interval (Step S201). Further, the acquired battery liquid-shortage time is stored in the memory 21a. Meanwhile, in Step S201, the communication controller 21 may acquire a battery liquid-shortage time from the memory 22d at a predetermined time and may acquire a battery liquid-shortage time by using the reception of a transmission request, which is requested from the management server 102, as a trigger.

After that, it is determined whether or not the current time is a transmission timing at which moving-body information is transmitted to the management server 102 (Step S202). The transmission timing may be set to a regular time, such as a daily fixed time or a monthly fixed time, or an irregular time such as a time when transmission is requested from the management server 102. When the transmission timing is a daily fixed time or a monthly fixed time, these timings are stored in a memory unit (not illustrated) or the memory 21a of the communication controller 21 in advance. Further, when these timings are to be changed, these timings can be changed by a change command sent from the management server 102. If the current time is the transmission timing (Yes in Step S202), information (hereinafter, battery liquid amount-state information), which includes the battery liquid-shortage time, time information indicating the transmission time measured by the time information generating unit, and vehicle IDs, is transmitted to the management server 102 (Step S203). On the other hand, if the current time is not the transmission timing (No in Step S202), this processing ends as it is. However, the latest battery liquid-shortage time is stored and updated in the memory 21a.

Meanwhile, description has been made on the premise that the battery liquid-shortage time updated by the master controller 22 is a cumulative time. In this case, the battery liquid-shortage time transmitted by the communication controller 21 may be a difference time between the time of previous transmission and the time of the current transmission, and may be a cumulative time. It is preferable that a difference time be used in the case of the transmission of a daily fixed time and a cumulative time be used in the case of the transmission of a monthly fixed time. Further, the master controller 22 itself may store a daily difference time in the memory 22d, and the communication controller 21 may transmit a difference time.

(Modification of Detection of Shortage of Battery Liquid)

Figure 5:
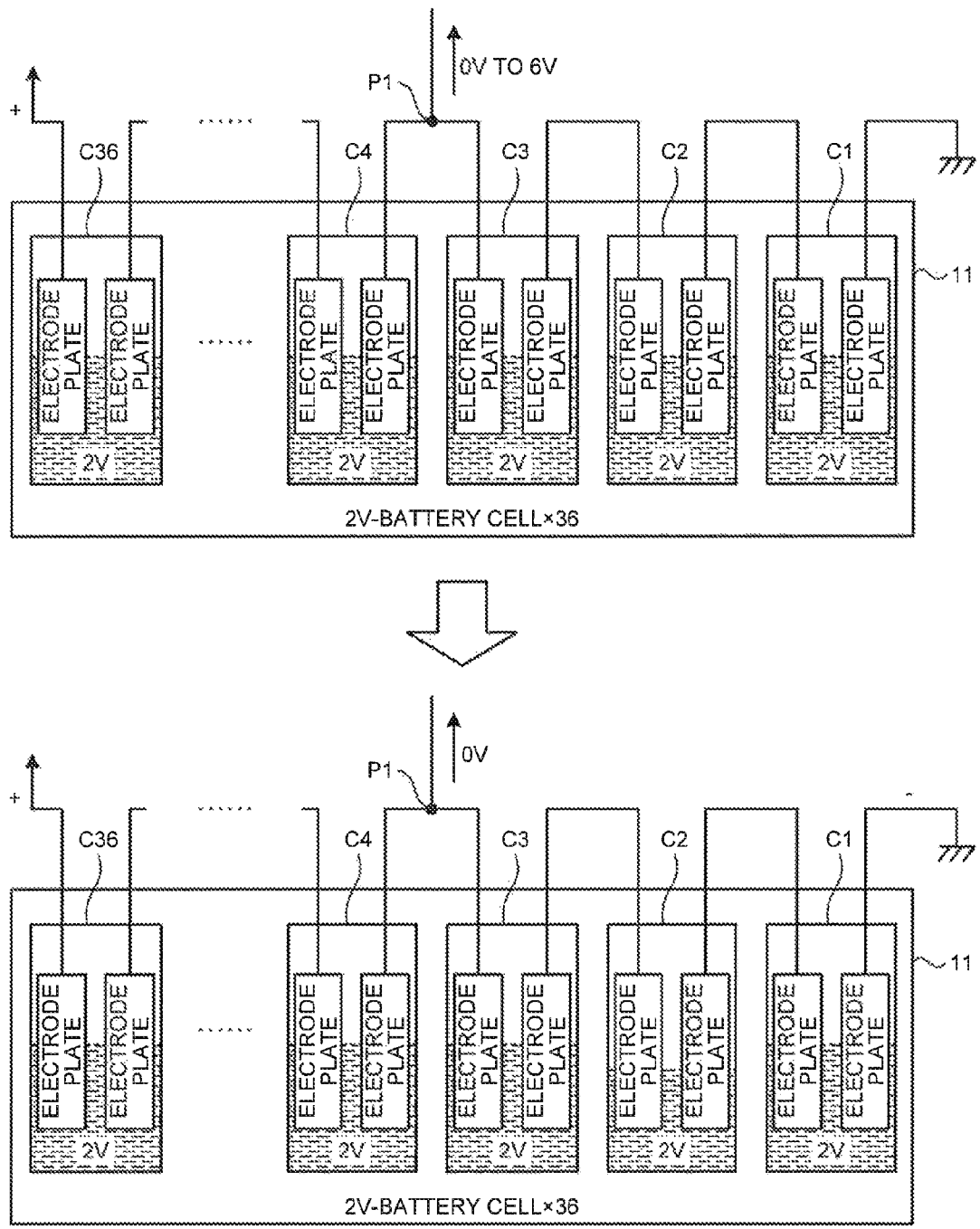
FIG. 5 is a schematic diagram illustrating positions where the voltage of a battery is detected.

As illustrated in FIG. 5, the battery liquid shortage detection unit 22a detects a voltage at the branch point P1, which is positioned between the third 2V-battery cell C3 and the fourth 2V-battery cell C4 from the minus side of the battery 11, as the battery liquid amount-detection voltage in the above-mentioned embodiment. Further, for example, when the shortage of the battery liquid occurs in the 2V-battery cell C2 as illustrated at the lower portion of FIG. 5, the output voltage of the 2V-battery cell C2 is decreased. The battery liquid shortage detection unit 22a detects the magnitude of the battery liquid amount-detection voltage in the range of 0 to 6 V, and detects the shortage of the battery liquid when the battery liquid amount-detection voltage is equal to or lower than a predetermined threshold. That is, in this embodiment, 2V-battery cells C1 to C3 typify all 2V-battery cells. It is advantageous in this embodiment that a voltage in the range of 0 to 6 V can be used as a detection voltage as it is.

Figure 6:
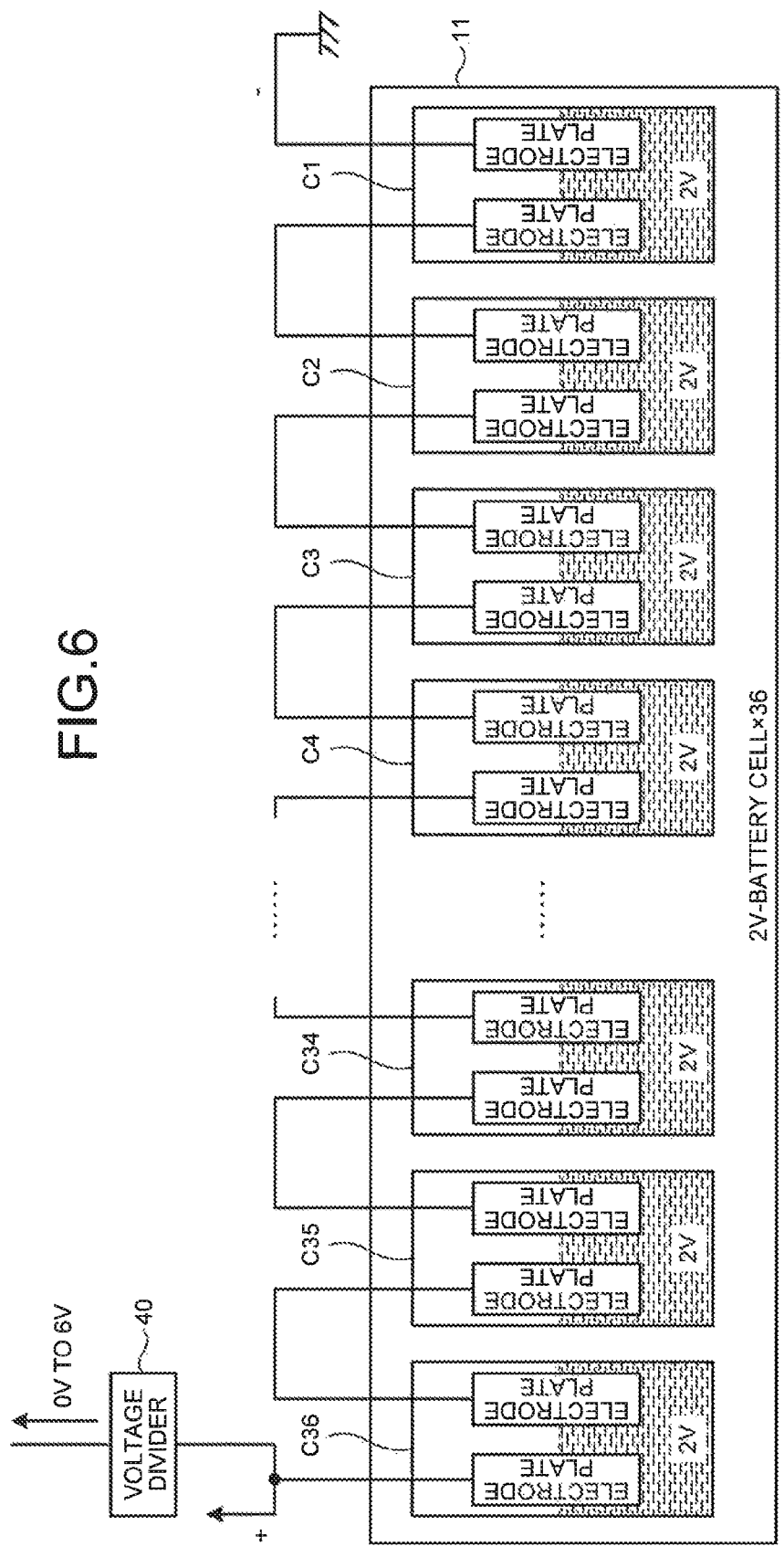
FIG. 6 is a schematic diagram illustrating the configuration of a detection circuit, when the shortage of a battery liquid of all battery cells of the battery is detected.

In this modification, as illustrated in FIG. 6, a plus-side voltage (0 to 72 V) of a 2V-battery cell C36, which is positioned closest to the plus side, is taken, is converted into a voltage in the range of 0 to 6 V by a voltage divider 40, and is output to the battery liquid shortage detection unit 22a. Accordingly, it is possible to detect the shortage of the battery liquid in all the 2V-battery cells C1 to C36.

Figure 7:
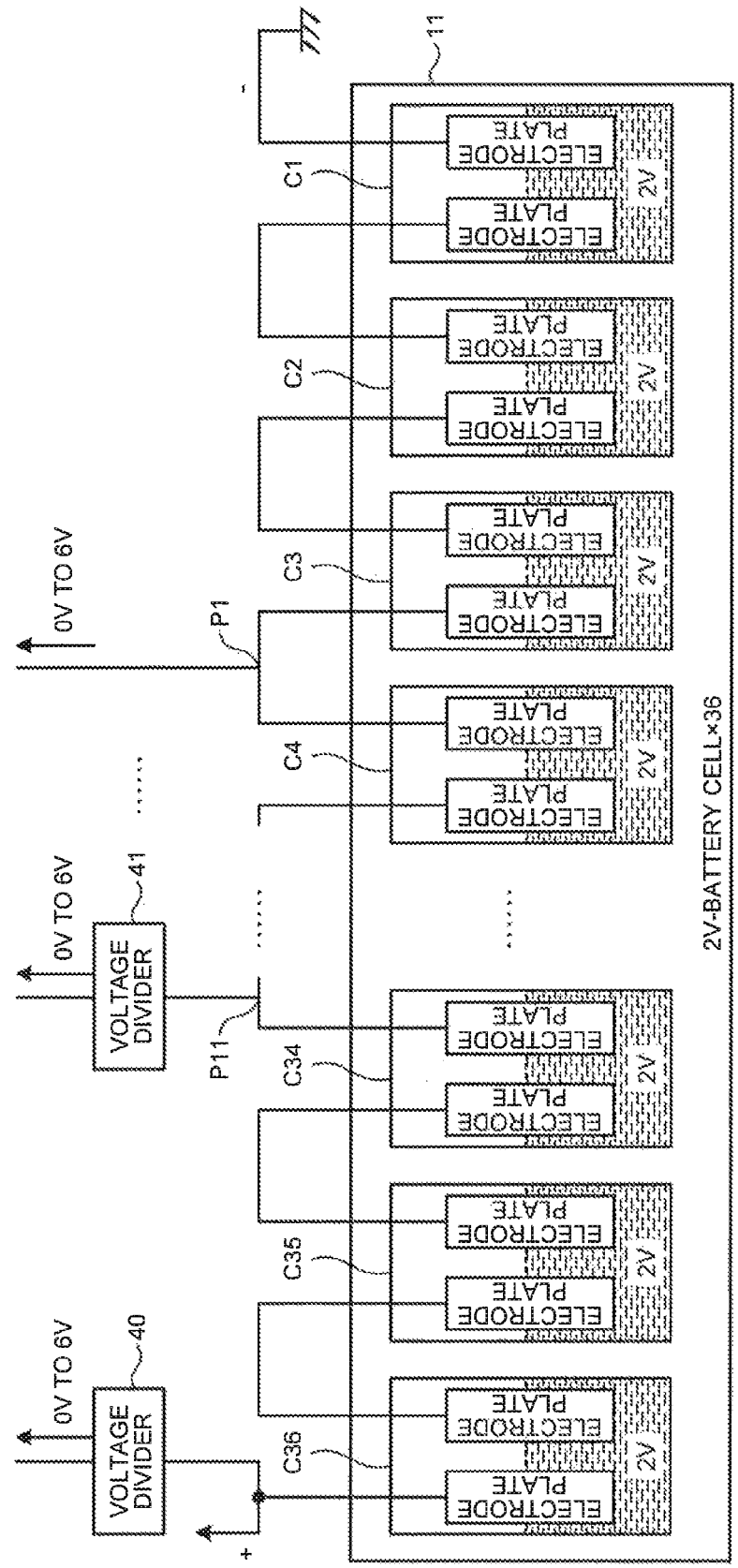
FIG. 7 is a schematic diagram illustrating the configuration of a detection circuit when all battery cells of the battery are grouped together and the shortage of a battery liquid is detected.

Further, as illustrated in FIG. 7, all the 2V-battery cells C1 to C36 may be organized into groups each of which includes three 2V-battery cells, and the shortage of the battery liquid of each group may be detected. It is easy to specify a 2V-battery cell in which the shortage of a battery liquid occurs, by this grouping. Meanwhile, the number of voltage detection lines L6 in this case is twelve. Furthermore, a voltage divider needs to be provided so that a detection voltage in the range of 0 to 6 V is applied to each of the voltage detection lines except for the voltage detection line of the branch point P1. For example, a voltage in the range of 0 to 30 V is detected at a branch point P11, but a voltage divider 41 for converting this voltage range to the range of 0 to 6 V is necessary.

(Reset Processing of Battery Liquid-Shortage Time)

In the above-mentioned embodiment, the battery liquid-shortage time is transmitted to the management server 102. Here, when an operator or the like perceives the shortage of a battery liquid and refills the battery with the battery liquid, the shortage state of the battery liquid is solved. In this case, there is a possibility that the management server 102 still recognizes the shortage of the battery liquid although the shortage of the battery liquid is solved in the battery forklift 1. For this reason, when a predetermined time has passed after the shortage of the battery liquid is detected, in this modification, it is regarded as that the battery is refilled with a battery liquid and the battery liquid-shortage time having been kept is reset.

Figure 8:
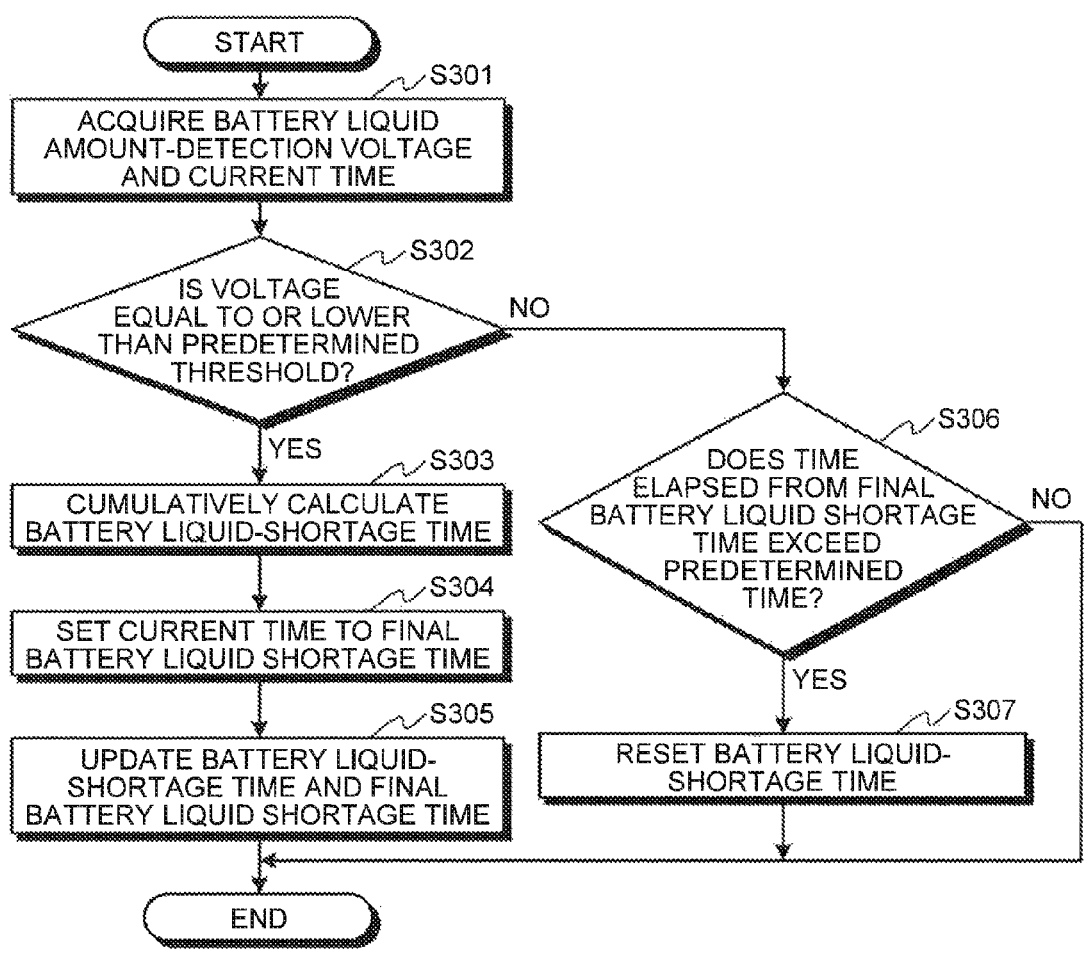
FIG. 8 is a flowchart illustrating the procedure of the calculation processing of a battery liquid-shortage time that includes the reset processing of a battery liquid-shortage time.

FIG. 8 is a flowchart illustrating the procedure of the calculation processing of a battery liquid-shortage time that includes the reset processing of a battery liquid-shortage time. As illustrated in FIG. 8, the battery liquid shortage detection unit 22a acquires a battery liquid amount-detection voltage through the voltage detection line L6 by sampling that is performed at a predetermined interval and acquires time information, which indicates the current time, from the time information generating unit (Step S301). After that, it is determined that the battery liquid amount-detection voltage is equal to or lower than a predetermined threshold (Step S302).

If the battery liquid amount-detection voltage is equal to or lower than the predetermined threshold (Yes in Step S302), the battery liquid is insufficient. Accordingly, cumulative calculation for adding a time, which is elapsed between the previous sampling and the current sampling, that is, a sampling time to the battery liquid-shortage time stored in the memory 22d is performed (Step S303). Further, the current time acquired in Step S301 is set to a final battery liquid shortage time (Step S304). After that, the battery liquid-shortage time stored in the memory 22d and the final, battery liquid shortage time are updated (Step S305), and then this processing ends.

On the other hand, if the battery liquid amount-detection voltage is not equal to or lower than the predetermined threshold (No in Step S302), it is further determined whether or not a time elapsed from the final battery liquid shortage time having been recently updated exceeds a predetermined time (Step S306). If the elapsed time exceeds the predetermined time (Yes in Step S306), it is regarded as that the battery is already refilled with a battery liquid, processing for resetting the battery liquid-shortage time stored in the memory 22d is performed (Step S307), and this processing ends. On the other hand, if the elapsed time does not exceed the predetermined time (No in Step S306), this processing ends as it is. Meanwhile, after Step S307, a battery-normality signal may be generated in conjunction with the reset processing and may be transmitted to the management server 102 as one of operating states. The battery-normality signal is a signal indicating that the shortage of the battery liquid of the battery 11 has been solved. When the management server 10 receives this signal, an operator of the management server 102, for example, a person performing the maintenance of the battery forklifts 1 can definitely grasp that the shortage of the battery liquid of the battery forklift 1 in which the shortage of the battery liquid has occurred is solved. Meanwhile, if the battery-normality signal and the time information measured by the time information generating unit are linked to each other and transmitted to the management server 102, it is possible to grasp when the shortage of the battery liquid has been solved. This time information indicates a time at which moving-body information such as an operating state is transmitted to the management, server 10, but may indicate a time at which the battery liquid-shortage time is output to the output unit, such as the monitor panel 36 or the transmission/reception unit 31 as described above.

Meanwhile, the above-mentioned reset processing is performed in the battery forklift 1, but may be performed in the management server 102. In this case, the battery forklift 1 transmits battery liquid amount-state information, which includes the final battery liquid shortage time, to the management server 102.

Figure 9:
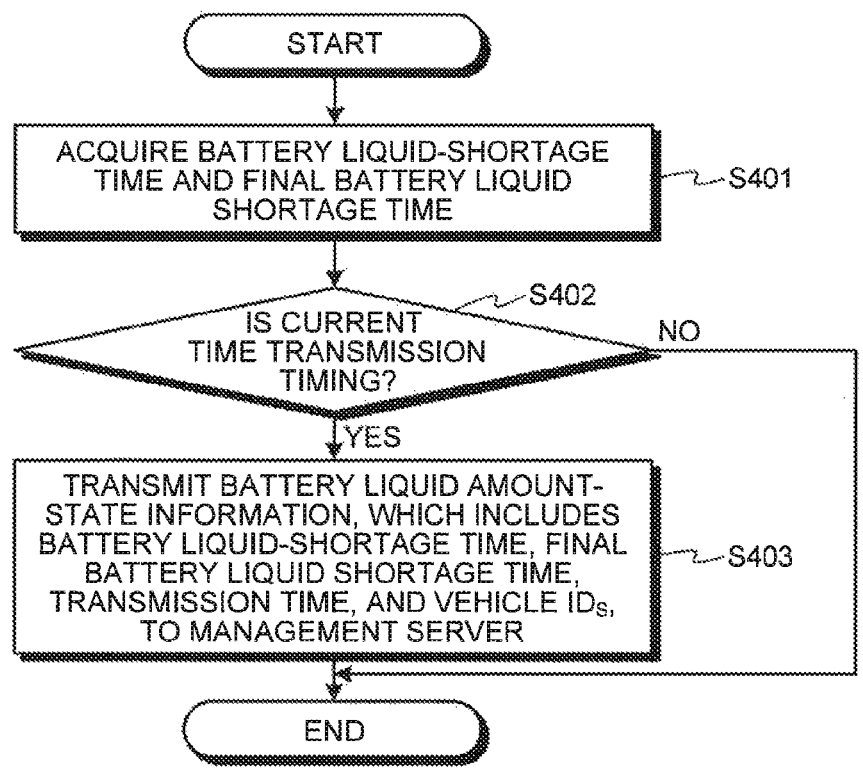
FIG. 9 is a flowchart illustrating the procedure of transmission processing, which is performed in the battery forklift, when the reset processing of a battery liquid shortage time is performed in a management server.

That is, as illustrated in FIG. 9, first, the communication controller 21 acquires a battery liquid-shortage time, which is stored in the memory 22d of the master controller 22, and the final battery liquid shortage time by sampling that is performed at a predetermined interval (Step S401). Further, the acquired battery liquid-shortage time and the acquired final battery liquid shortage time are stored in the memory 21a.

After that, it is determined whether or not the current time is a transmission timing at which moving-body information is transmitted to the management server 102 (Step S402). If the current time is the transmission timing (Yes in Step S402), battery liquid amount-state information, which includes the battery liquid-shortage time, the final battery liquid shortage time, time information indicating the transmission time, and vehicle IDs, is transmitted to the management server 102 (Step S403). On the other hand, if the current time is not the transmission timing (No in Step S402), this processing ends as it is. Accordingly, even though the reset processing is not performed in the battery forklift 1, it is possible to perform the processing for resetting the battery liquid-shortage time in the management server 102.

(Management Processing of Management Server)

Figure 10:
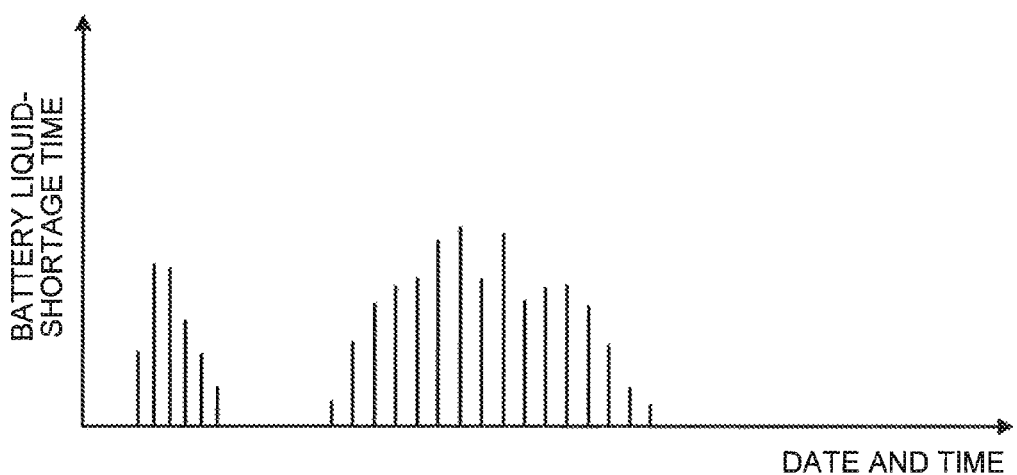
FIG. 10 is a diagram illustrating an example of the history management of a battery liquid-shortage time that is performed by the management server.

Since the management server 102 can obtain the above-mentioned battery liquid-shortage time from each of the battery forklifts 1, the management server 102 can quickly warn an operator or a person who performs maintenance. Further, since the management server 102 can obtain time information, such as a transmission time, attached to a battery liquid-shortage time, the management server 102 can manage the history of the battery liquid-shortage time of each of the battery forklifts 1 as illustrated in FIG. 10. Furthermore, each of the battery forklifts 1 can acquire position information by the GPS sensor 30 as described above, and can transmit the obtained position information to the management server 102 at the timing of Step S202 of FIG. 4 or Step S402 of FIG. 9. That is, the position information and the vehicle IDs included in the battery liquid amount-state information are linked and stored in the management server 102. A person performing the maintenance of the battery forklifts 1 can know a period in which the shortage of the battery liquid is likely to occur or can know a place in which a battery forklift 1 showing the shortage of the battery liquid operates, and can check a way to cope with the shortage of the battery liquid or a maintenance plan for the refill of the battery liquid, by managing and analyzing the history of the battery liquid-shortage time. Moreover, a battery forklift of which the battery liquid is insufficient can be displayed and output on a map of the display unit 102ƒ by using a predetermined design or the like so as to be superimposed. Accordingly, it is possible to definitely grasp whether the battery liquid of a battery forklift 1 operating at a certain place is insufficient. Further, if a place in which the shortage of the battery liquid frequently occurs can be specified, it is also possible to estimate that a battery forklift 1 operating at the place is frequently charged and discharged. According to the above-mentioned system 100 for managing the state of the amount of the battery liquid, it is possible to appropriately refill the battery with a battery liquid and to perform the check of a plan for the replacement of the battery 11 itself, the planned preparation of new batteries 11, and the like.

Further, since the management server 102 can obtain vehicle IDs, the management server 102 can easily manage the shortage state of the battery liquid or the battery state of each of the battery forklifts even though a plurality of same types of vehicles are present in the same region. For example, the battery states of a plurality of battery forklifts can be collectively managed by a person who needs to monitor the plurality of battery forklifts operating in a factory. The vehicle IDs may correspond to the unique serial numbers of the respective forklifts 1, and may be the serial number or the like of the communication controller 21. That is, the vehicle IDs only have to individually identify the respective forklifts.

Meanwhile, in the above-mentioned embodiment, the battery liquid shortage detection unit 22a detects the shortage of the battery liquid when the battery liquid amount-detection voltage is equal to or lower than a predetermined threshold. However, the invention is not limited thereto. A battery liquid amount-detection voltage may be divided into two stages, and a battery liquid amount-detection voltage of the first stage may be set to, for example, 3 V or less. When the battery liquid amount-detection voltage is 3 V or less, the battery liquid shortage detection unit 22a may detect the shortage of the battery liquid. The range of a battery liquid amount-detection voltage of the second stage may be set to be, for example, higher than 3 V and 4 V or less. When the battery liquid amount-detection voltage is in that range, the battery liquid shortage detection unit 22a may output a signal detecting that the amount of the battery liquid tends to decrease. It is possible to finely manage the shortage state of the battery liquid by detecting the degree of the shortage state of the battery liquid in two stages as described above.

Further, the communication controller 21 and the master controller 22 are formed as separate controllers in the above-mentioned embodiment, but the communication controller may be provided in the master controller 22.

Furthermore, various kinds of information may be transmitted to the management server 102 as information on the battery 11 other than the battery liquid amount-state information including the battery liquid-shortage time or the final battery liquid shortage time. For example, whenever charging is performed, information indicating the charging time and charged electric energy of the battery 11 is obtained by a sensor or the like provided in the battery forklift 1 and these kinds of information may be transmitted to the management server 102 together.

Further, the above-mentioned embodiment is based on the premise that information on a battery liquid-shortage time and the like is transmitted to the management server 102, but the invention is not limited thereto. These kinds of information may be transmitted to the monitor panel 36 of the battery forklift 1 without using a communication system, and may be displayed on a display unit (not illustrated) of the monitor panel 36. Even in this case, the controller 20 attaches time information, which indicates the current time measured by the time information generating unit, to a battery liquid-shortage time as a timestamp, and outputs the battery liquid-shortage time with the time in to the monitor panel 36 through the monitor controller 23. A mountainous region or a region in which radio communication facilities are not provided is a region in which radio communication is not available. In the case of a forklift 1 operating in such a place, when an operator or a person performing maintenance sees information indicating a battery liquid-shortage time or time information which is displayed on the monitor panel 36, the operator or the person can recognize the shortage of the battery liquid.

Moreover, description has been made in the above-mentioned embodiment on the premise that the battery 11 and the capacitor 12 are used, but the invention is also applied to a battery forklift that is driven only by the battery 11 without the capacitor 12. Further, the battery forklift 1 is an example of an industrial vehicle as described above and this embodiment can be applied generally to an industrial vehicle. For example, this embodiment is also applied to an electric construction machine that is configured to drive an electric motor by using a battery as a power source without an engine, to drive a hydraulic pump by the electric motor to supply a working fluid to a hydraulic cylinder of a working machine, and to operate the working machine.

REFERENCE SIGNS LIST

1 BATTERY FORKLIFT
2 VEHICLE BODY
3b FORK
3a MAST
3 CARGO HANDLING DEVICE
4 DRIVER'S SEAT
5 FRONT CONSOLE
6 STEERING WHEEL
7 FORWARD/REVERSE LEVER
8 LIFT LEVER
9 TILT LEVER
10 ACCELERATOR PEDAL
11 BATTERY
12 CAPACITOR

13 DRIVE WHEEL
14 STEERED WHEEL
15 TRAVELING MOTOR
16 CARGO HANDLING MOTOR
17 CABIN
17a GPS ANTENNA
17b TRANSMISSION/RECEPTION ANTENNA
20 CONTROLLER
21 COMMUNICATION CONTROLLER
21a, 22d MEMORY
21b CLOCK
22 MASTER CONTROLLER
22a BATTERY LIQUID SHORTAGE DETECTION UNIT
22b BATTERY LIQUID-SHORTAGE TIME CALCULATION UNIT
22c OUTPUT PROCESSING UNIT
23 MONITOR CONTROLLER
24 ID KEY CONTROLLER
30 GPS SENSOR
31 TRANSCEIVER
32 KEY SWITCH
33 DC/DC CONVERTER
34 CARGO HANDLING INVERTER
35 TRAVELING INVERTER
36 MONITOR PANEL
37 CHARGER
40, 41 VOLTAGE DIVIDER
100 SYSTEM FOR MANAGING STATE OF THE AMOUNT OF BATTERY LIQUID
101 BASE STATION SERVER
101a TRANSMISSION/RECEPTION ANTENNA
102 MANAGEMENT SERVER
102a POSITION INFORMATION DATABASE
102b MAP INFORMATION DATABASE
102c ID INFORMATION DATABASE
102d BATTERY LIQUID AMOUNT-STATE INFORMATION DATABASE
102e WARNING UNIT
102f DISPLAY UNIT
L1 COMMUNICATION LINE
L2 POWER SUPPLY LINE
L3 POWER SUPPLY LINE
L4 CONTROL LINE
L5 DRIVE CONTROL LINE
L6 VOLTAGE DETECTION LINE
C1 to C36 2V-BATTERY CELL
P1, P11 BRANCH POINT
NW NETWORK
ST GPS SATELLITE

The invention claimed is:

1. An industrial vehicle comprising:
a storage battery that includes a plurality of battery cells including electrolyte and electrode plates, the battery cells being connected in series, and a detecting point, disposed between the electrode plates of adjacent battery cells, at which a voltage value for detecting a shortage of the electrolyte is detected;
an electrolyte shortage detection unit that detects a shortage of the electrolyte in at least one of the battery cells by detecting a voltage value at the detecting point;
an electrolyte-shortage time calculation unit that calculates an electrolyte-shortage time, which is a cumulative time of the shortage of the electrolyte detected by the electrolyte shortage detection unit when the shortage of the electrolyte continues;
a memory unit that stores the electrolyte-shortage time calculated by the electrolyte-shortage time calculation unit;
a time information generating unit that generates time information; and an output processing unit that performs output processing for attaching the time information to the electrolyte-shortage time stored in the memory unit and outputting the electrolyte-shortage time with the time information to an output unit, at a predetermined timing.

2. The industrial vehicle according to claim 1, wherein the electrolyte shortage detection unit stores a final electrolyte shortage time, which is a time when the shortage of the electrolyte is detected, in the memory unit and then resets the electrolyte-shortage time stored in the memory unit when the shortage of the electrolyte is not detected by the electrolyte shortage detection unit and a time elapsed from the final electrolyte shortage time exceeds a predetermined time.

3. The industrial vehicle according to claim 1, wherein the electrolyte shortage detection unit includes a plurality of detecting points, disposed between adjacent battery cells, at each of which a voltage value for detecting a shortage of the electrolyte is detected, and detects the shortage of the electrolyte by detecting a plurality of voltage values between the plurality of battery cells.

4. The industrial vehicle according to claim 1, wherein the output processing unit performs output processing for attaching the time information to a difference time of the cumulative electrolyte-shortage time and outputting the difference time with the time information to the output unit, at a predetermined timing.

5. The industrial vehicle according to claim 1, wherein the predetermined timing includes a regular time and an irregular time.

6. The industrial vehicle according to claim 1, further comprising:
a position detector that generates position information indicating a position of the industrial vehicle,
wherein the output processing unit performs output processing for outputting the position information and the electrolyte-shortage time to the output unit, at the predetermined timing.

7. A system for managing a state of an amount of electrolyte of an industrial vehicle, the system comprising:
an industrial vehicle including:
a storage battery that includes a plurality of battery cells including electrolyte and electrode plates, the battery cells being connected in series, and a detecting point, disposed between the electrode plates of adjacent battery cells, at which a voltage value for detecting a shortage of the electrolyte is detected;
an electrolyte shortage detection unit that detects a shortage of the electrolyte in at least one of the battery cells by detecting a voltage value at the detecting point;
an electrolyte-shortage time calculation unit that calculates an electrolyte-shortage time, which is a cumulative time of the shortage of the electrolyte detected by the electrolyte shortage detection unit when the shortage of the electrolyte continues;
a memory unit that stores the electrolyte-shortage time calculated by the electrolyte-shortage time calculation unit;
a time information generating unit that generates time information; and an output processing unit that performs output processing for attaching the time information to the electrolyte-shortage time stored in the memory unit and outputting the electrolyte-shortage time with the time information to an output unit, at a predetermined timing; and a management server that communicates with the industrial vehicle, wherein the output processing unit attaches the time information to the electrolyte-shortage time stored in the memory unit and outputs the electrolyte-shortage time with the time information to the management server by radio communication, at a predetermined timing.

8. The system according to claim 7, wherein the management server includes a warning unit that sets warning levels depending on length of the electrolyte-shortage time and outputs warning according to the warning levels.

9. An electric forklift comprising:

a storage battery that includes a plurality of battery cells including electrolyte and electrode plates, the battery cells being connected in series, and a detecting point, disposed between the electrode plates of adjacent battery cells, at which a voltage value for detecting a shortage of the electrolyte is detected;

an electrolyte shortage detection unit that detects a shortage of the electrolyte in at least one of the battery cells by detecting a voltage value at the detecting point;

an electrolyte-shortage time calculation unit that calculates an electrolyte-shortage time, which is a cumulative time of the shortage of the electrolyte detected by the electrolyte shortage detection unit when the shortage of the electrolyte continues;

a memory unit that stores the electrolyte-shortage time calculated by the electrolyte-shortage time calculation unit;

a time information generating unit that generates time information; and an output processing unit that performs output processing for attaching the time information to the electrolyte-shortage time stored in the memory unit and outputting the electrolyte-shortage time with the time information to an output unit, at a predetermined timing, wherein the electrolyte shortage detection unit detects the shortage of the electrolyte by detecting a plurality of voltage values between the plurality of battery cells, and the output unit transmits information, which is obtained by attaching the time information to the electrolyte-shortage time stored in the memory unit, by radio communication.

10. An industrial vehicle comprising:

a storage battery that includes a plurality of battery cells including electrolyte and electrode plates, the battery cells being connected in series, and a detecting point, disposed between the electrode plates of adjacent battery cells, at which a voltage value for detecting a shortage of the electrolyte is detected;

an electrolyte shortage detection unit that detects a shortage of the electrolyte by detecting a voltage value between the plurality of battery cells;

an electrolyte-shortage time calculation unit that calculates an electrolyte-shortage time, which is a cumulative time of the shortage of the electrolyte detected by the electrolyte shortage detection unit when the shortage of the electrolyte continues;

a memory unit that stores the electrolyte-shortage time calculated by the electrolyte-shortage time calculation unit;

a time information generating unit that generates time information; and an output processing unit that performs output processing for attaching the time information to the electrolyte-shortage time stored in the memory unit and outputting the electrolyte-shortage time with the time information to an output unit, at a predetermined timing, wherein the electrolyte shortage detection unit stores a final electrolyte shortage time, which is a time when the shortage of the electrolyte is detected, in the memory unit and then resets the electrolyte-shortage time stored in the memory unit when the shortage of the electrolyte is not detected by the electrolyte shortage detection unit and a time elapsed from the final electrolyte shortage time exceeds a predetermined time.

11. The industrial vehicle according to claim 10, wherein the electrolyte shortage detection unit detects the shortage of the electrolyte by detecting a plurality of voltage values between the plurality of battery cells.

12. The industrial vehicle according to claim 10, wherein the output processing unit performs output processing for attaching the time information to a difference time of the cumulative electrolyte-shortage time and outputting the difference time with the time information to the output unit, at a predetermined timing.

13. The industrial vehicle according to claim 10, wherein the predetermined timing includes a regular time and an irregular time.

14. The industrial vehicle according to claim 10, further comprising:

a position detector that generates position information indicating a position of the industrial vehicle, wherein the output processing unit performs output processing for outputting the position information and the electrolyte-shortage time to the output unit, at the predetermined timing.

15. A system for managing a state of an amount of electrolyte of an industrial vehicle, the system comprising:

an industrial vehicle including:

a storage battery that includes a plurality of battery cells including electrolyte and electrode plates, the battery cells being connected in series, and a detecting point, disposed between the electrode plates of adjacent battery cells, at which a voltage value for detecting a shortage of the electrolyte is detected;

an electrolyte shortage detection unit that detects a shortage of the electrolyte by detecting a voltage value between the plurality of battery cells;

an electrolyte-shortage time calculation unit that calculates an electrolyte-shortage time, which is a cumulative time of the shortage of the electrolyte detected by the electrolyte shortage detection unit when the shortage of the electrolyte continues;

a memory unit that stores the electrolyte-shortage time calculated by the electrolyte-shortage time calculation unit;

a time information generating unit that generates time information; and an output processing unit that performs output processing for attaching the time information to the electrolyte-shortage time stored in the memory unit and outputting the electrolyte-shortage time with the time information to an output unit, at a predetermined timing; and a management server that communicates with the industrial vehicle, wherein the electrolyte shortage detection unit stores a final electrolyte shortage time, which is a time when the shortage of the electrolyte is detected, in the memory unit and then resets the electrolyte-shortage time stored in the memory unit when the shortage of the electrolyte is not detected by the electrolyte shortage detection unit and a time elapsed from the final electrolyte shortage time exceeds a predetermined time, and wherein the output processing unit attaches the time information to the electrolyte-shortage time stored in the memory unit and outputs the electrolyte-shortage time with the time information to the management server by radio communication, at a predetermined timing.

16. The system according to claim 15, wherein the management server includes a warning unit that sets warning levels depending on length of the electrolyte-shortage time and outputs warning according to the warning levels.

17. An electric forklift comprising:

a storage battery that includes a plurality of battery cells including electrolyte and connected in series;

an electrolyte shortage detection unit that detects a shortage of the electrolyte by detecting a voltage value between the plurality of battery cells;

an electrolyte-shortage time calculation unit that calculates an electrolyte-shortage time, which is a cumulative time of the shortage of the electrolyte detected by the electrolyte shortage detection unit;

a memory unit that stores the electrolyte-shortage time calculated by the electrolyte-shortage time calculation unit;

a time information generating unit that generates time information; and an output processing unit that performs output processing for attaching the time information to the electrolyte-shortage time stored in the memory unit and outputting the electrolyte-shortage time with the time information to an output unit, at a predetermined timing, wherein the electrolyte shortage detection unit detects the shortage of the electrolyte by detecting a plurality of voltage values between the plurality of battery cells, the output unit transmits information, which is obtained by attaching the time information to the electrolyte-shortage time stored in the memory unit, by radio communication, and the electrolyte shortage detection unit stores a final electrolyte shortage time, which is a time when the shortage of the electrolyte is detected, in the memory unit and then resets the electrolyte-shortage time stored in the memory unit when the shortage of the electrolyte is not detected by the electrolyte shortage detection unit and a time elapsed from the final electrolyte shortage time exceeds a predetermined time.

* * * * *